United States Patent [19]

Andrea, III

[11] 4,144,497
[45] Mar. 13, 1979

[54] TWO-WAY COMMUNICATIONS SYSTEM HAVING REMOTE CHANNEL SELECTION

[75] Inventor: Ralph W. Andrea, III, Sunrise, Fla.

[73] Assignee: Motorola, Inc., Schaumburg, Ill.

[21] Appl. No.: 824,994

[22] Filed: Aug. 15, 1977

[51] Int. Cl.$^2$ ............................................. H04B 1/06
[52] U.S. Cl. ...................................... 325/302; 325/2; 325/21; 325/57; 343/177
[58] Field of Search .......................... 325/2-5, 325/7, 8, 21, 22, 51-57, 64, 301, 302, 304, 306, 368; 343/175, 176, 200, 177; 179/2 EB

[56] References Cited

U.S. PATENT DOCUMENTS

| | | | |
|---|---|---|---|
| 3,238,503 | 3/1966 | Ultermark et al. | 325/55 |
| 3,955,140 | 5/1976 | Stephens et al. | 325/57 |
| 4,012,597 | 3/1977 | Lynk, Jr. et al. | 325/55 |
| 4,030,040 | 6/1977 | Harbert | 325/302 |
| 4,041,393 | 8/1977 | Reed | 325/54 |
| 4,056,779 | 11/1977 | Toler | 325/57 |
| 4,056,780 | 11/1977 | Faulkner | 325/57 |

Primary Examiner—Robert L. Griffin
Assistant Examiner—Jin F. Ng
Attorney, Agent, or Firm—Margaret Marsh Parker; James W. Gillman

[57] ABSTRACT

A channel priority encoder in a mobile/repeater unit of a two-way communications system allows a low power, detached unit to remotely select a desired channel for high power repeater transmission to and reception from a base station. The selection can be latched-in permanently or can be made to revert to a home channel after a delay. The mobile unit can override a channel selection made by the detached unit, but another mobile unit would provide the repeater function.

5 Claims, 6 Drawing Figures

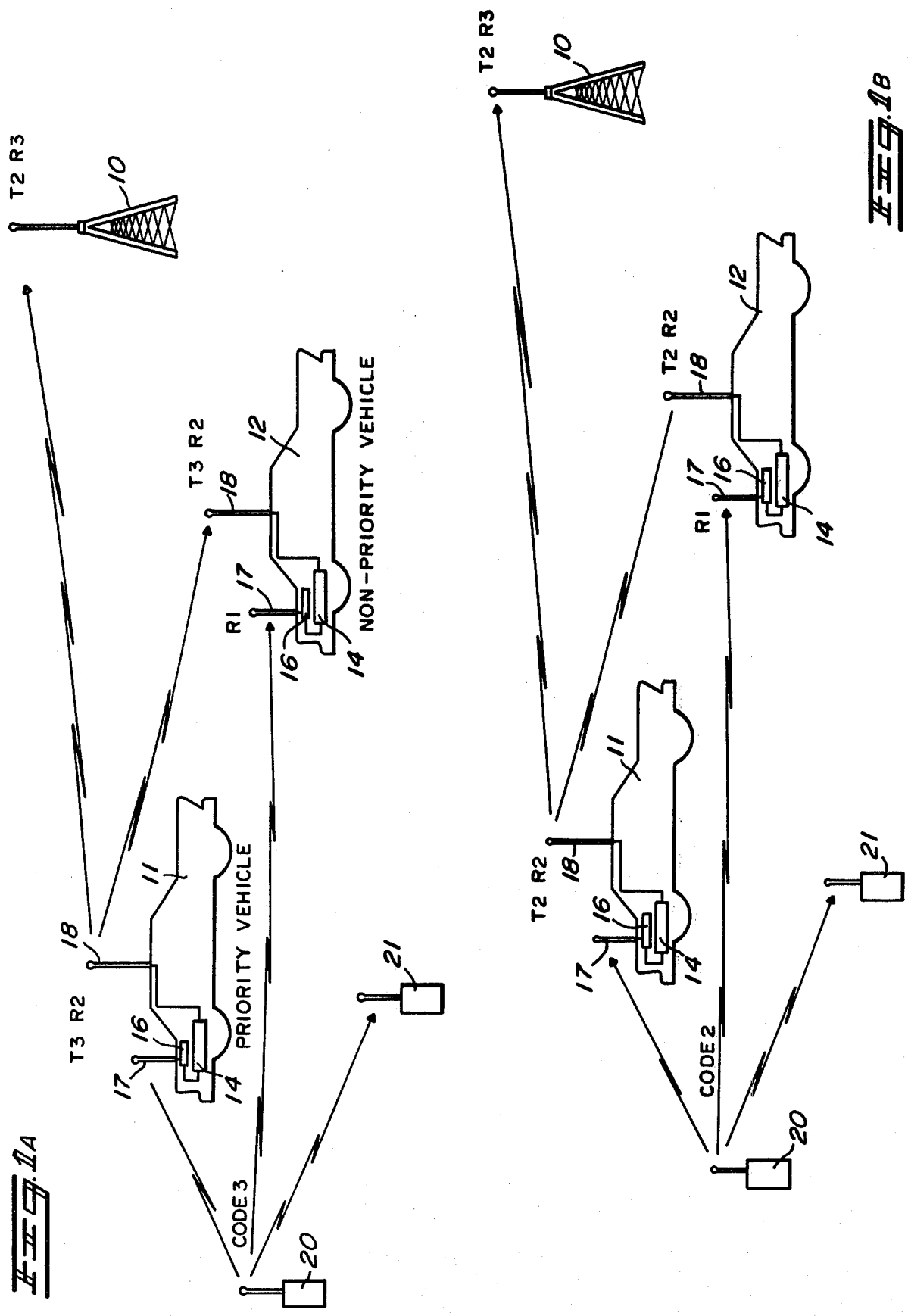

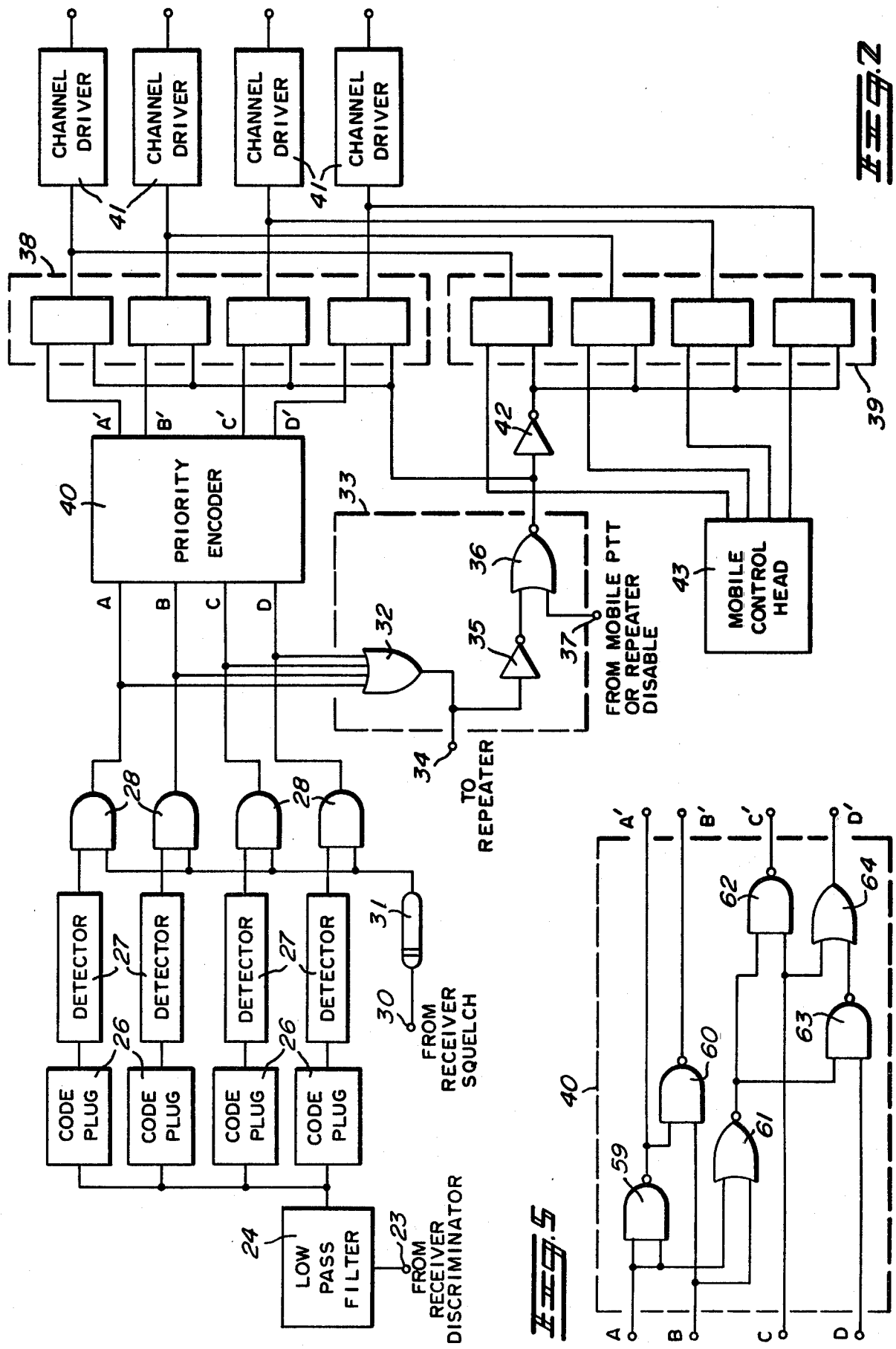

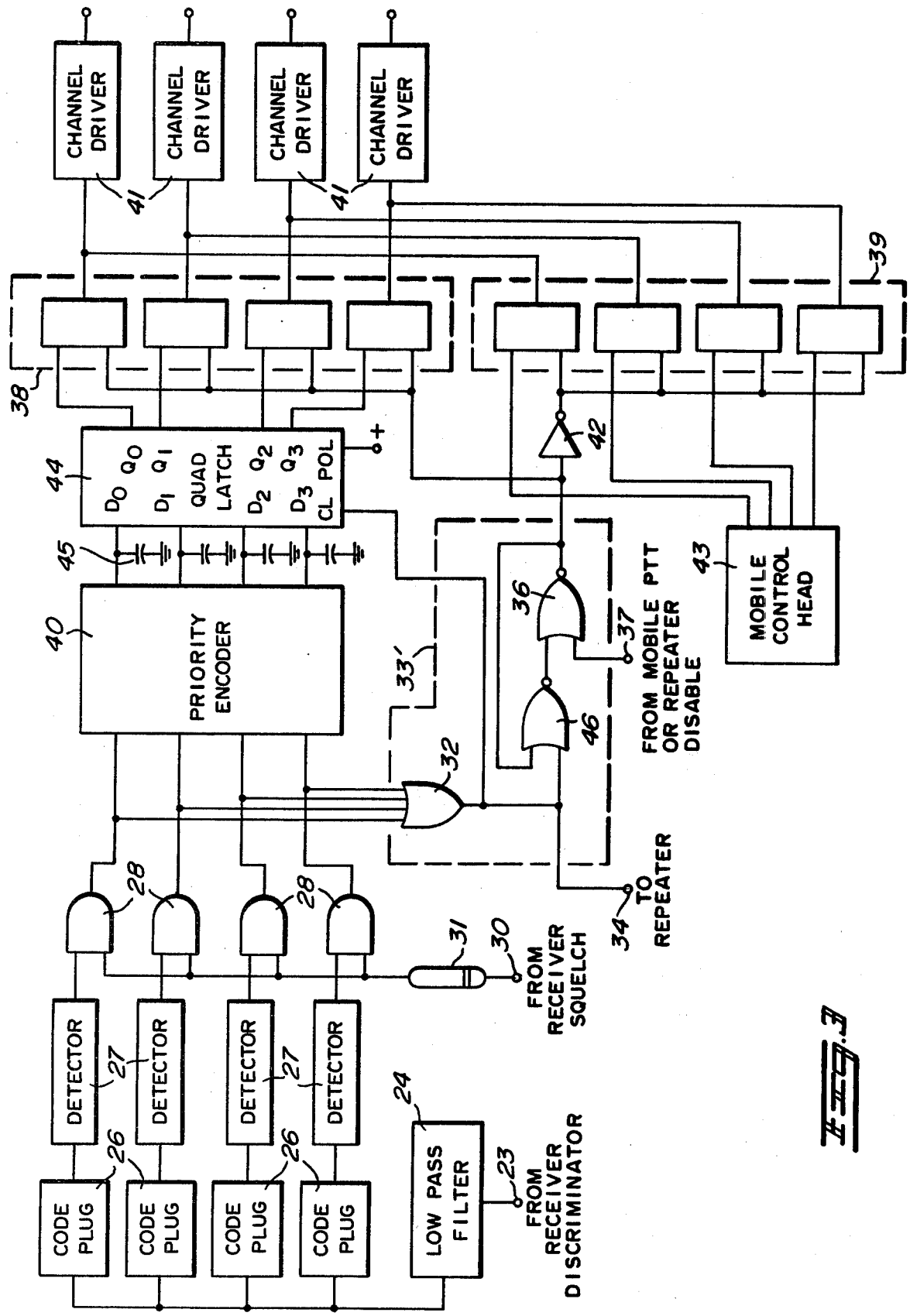

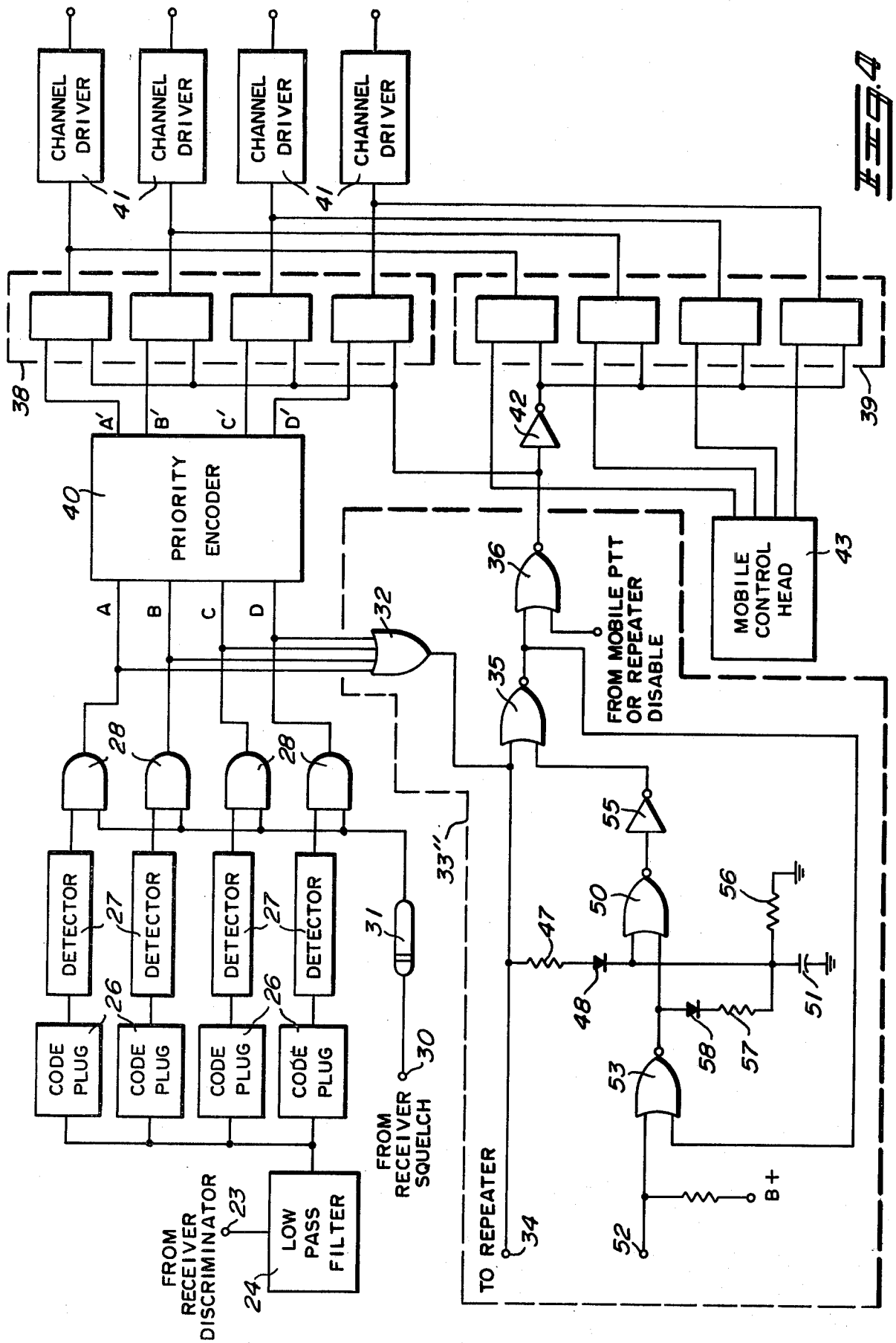

TWO-WAY COMMUNICATIONS SYSTEM HAVING REMOTE CHANNEL SELECTION

BACKGROUND OF THE INVENTION

This invention relates to the field of two-way communications and more particularly to the capability of remote channel selection.

The development of mobile communications systems began with vehicles having only a receiver for receiving information from a base station, then quickly progressed to a two-way system. Later, portable units were added to the mobile units in the vehicles to enable users to remain in contact with the base station, whether in or out of the vehicle. The next major step was the addition of a repeater unit to the vehicle, whereby transmission from the relatively low powered portable unit is picked up by the mobile unit and retransmitted to the base station at a higher power on another frequency. Transmission back from the base station could be on this second frequency or still another frequency.

In public safety work, it frequently happens that several vehicles in a system are involved at one location, thus prioritization schemes were developed to ensure that one and only one mobile/repeater unit would repeat out all portable-to-base transmission at that location. Two such repeater prioritizing systems are disclosed in U.S. Pat. Nos. 4,056,780 and 4,056,779, both assigned to the same assignee as is the present invention. Repeater prioritization may be used with the present channel priority encoder, but the two systems are completely distinct.

Another, and parallel, development was the addition of multiple channel capability to mobile units. Thus, for example, in a state police system, a vehicle could travel throughout the state and be able to contact any base station within the system. Multiple channels are also utilized in other ways within a single area and it became desirable for a portable user to be able to change channels without having return to his vehicle to reset a channel selector. Under various circumstances, it may be desirable to have only the mobile-to-base channel selectable (transmitter steering), or to select the same channel for two-way communication with the base station. In the latter case, it may be desirable to latch-in the selection (transmitter/receiver latching), or to hold the channel selection until the end of a conversation and, then return the repeater to a "home" channel (transmitter/receiver steering).

SUMMARY OF THE INVENTION

It is, therefore, an object of the present invention to provide mobile channel select capability from a detached portable unit.

It is a particular object to include means of prioritizing the available channels.

It is another object to allow a choice of transmitter steering only, transmitter/receiver steering or transmitter/receiver latching.

These objects and others are provided in a mobile/repeater unit with multiple channel two-way communication capability and having means for decoding channel select information on a received transmission and for prioritizing simultaneous demands for transmission on two or more channels.

BRIEF DESCRIPTION OF THE DRAWINGS

FIGS. 1A and 1B show the general operation of a repeater system including the invention.

FIG. 2 is a logic/block diagram of a portion of a mobile/repeater unit with transmitter steering only.

FIG. 3 is a logic/block diagram of a mobile/repeater unit with transmitter/receiver latching.

FIG. 4 is a logic/block diagram of a mobile/repeater unit with transmitter/receiver steering.

FIG. 5 is a logic diagram of the channel priority encoder of FIGS. 2-4.

DETAILED DESCRIPTION OF A PREFERRED EMBODIMENT

The present invention will be best understood in the environment of a system to which it may be applied, though it is not so limited in application. Such a system is shown in simplified form in FIGS. 1A and 1B and includes a base station 10, priority vehicle 11 and non-priority vehicle 12. Each of the vehicles 11 and 12 contains a mobile transceiver 14 and a repeater 16. An antenna 17 is coupled to each repeater 16 and an antenna 18 is coupled to each transceiver 14. Also in the system are portable units 20 and 21, detached from the mobile/repeater units of vehicles 11 and 12 respectively. In a two-way communications system as shown, an occupant of one of the vehicles 11 or 12 could use the mobile transceiver within that vehicle for direct communication with the base station 10. Portable units 20 and 21, when detached, would normally transmit to the base station 10 by means of the repeater 16 and transceiver 14 in the priority vehicle 11. As shown in the above-referenced patents, mobile-base communication can use a single frequency in both directions, separate frequencies for each direction, or provide a choice of channels. The repeater in each vehicle is enabled when the associated portable unit 20 or 21 is removed from the charging socket (not shown) which typically includes a repeater-enabling switch. Also as described in the above-referenced patents, when more than one vehicle are at a particular location and the associated portable units are detached, mobile/repeater prioritization takes place, making one vehicle, generally the first vehicle on the scene, the priority unit. All portable-base communications from that location then utilize the priority vehicle's mobile transceiver/repeater. In such systems, portable transmission takes precedence over base portion or other mobile station transmission since portable-to-portable or portable-to-base communication is much more likely to be of an urgent nature. However, when a user returns to his vehicle and presses his push-to-talk (PTT) switch, his mobile unit will transmit to base. If his vehicle had been the priority vehicle, the depression of the PTT switch, or insertion of his portable into its charging unit, would cause another mobile/repeater to assume priority as described in the above-referenced patents.

In the system as shown in FIGS. 1A and 1B the mobile units provide a choice of frequencies or channels, each of which could be associated with a different base station or all may be utilized by a single base station. By means of the present invention, any one of these same channels may be selected remotely from any portable in the area by transmitting a tone code indicative of the desired channel.

FIG. 1A shows a system having transmitter steering only. The portable 20 has requested a repeater-to-base transmission on channel three and the portable 21 is merely receiving the portable 20 transmission. The repeater 16 in the priority vehicle 11 receives the request on the repeater antenna 17 and, if the mobile transmitter 14 in vehicle 11 is not already on channel three, the transmitter is switched to that channel. The mobile unit 14 in vehicle 11 will now be transmitting to the base 10 on channel three and, in this case, receiving base transmission on channel two. The repeater 16 in the non-priority vehicle 12 will receive the transmission from the portable 20 on the associated antenna 17 and the mobile transceiver will receive the transmission from the vehicle 11 on the associated antenna 18, but neither will be retransmitted.

In FIG. 1B, covering steering or latching of both transmitter and receiver, the portable 20 has requested a transmission to base on channel two, and the repeater 16 in the priority vehicle 11 has switched the mobile unit 14 to channel two. The mobile unit in vehicle 11 will now receive and transmit on channel two. The non-priority vehicle 12 has also received the request and has switched to channel two, but is still not repeating out.

The block diagram of FIG. 2 covers transmitter frequency selection only, and shows the elements to be added to the mobile/repeater unit which will cause it to respond to the portable request and switch the mobile transmitter to the required channel. This function may be termed "steering". In the exemplary system as shown in FIGS. 2-5, four channels are shown. It will be appreciated by those skilled in the art that more channels could be needed and could be accommodated by simple expansion of the circuitry of the invention. The user of the portable unit 20 has chosen a channel by means of a selector switch (not shown) on the portable unit 20. The portable unit then transmits a continuous, very low frequency tone during voice transmission. The transmission is received at the mobile/repeater unit and an output signal from the repeater discriminator (not shown) is coupled through an input terminal 23 to a low pass filter 24. The filter 24 takes out all frequencies above the very low tones used for channel selection, the cut-off point preferably being on the order of 200 Hz. The output of the filter 24 is coupled to each of four code plugs 26, one for each available channel, and each code plug 26 is coupled to a detector 27. The code plugs 26 may be any of the types well known in the art, each code plug being pre-programmed to provide an output only in response to a unique tone code. The output of each of the detectors 27 is coupled to one of four AND gates 28. Also coupled to each of the AND gates 28 is an enabling signal from the squelch circuit (not shown) via an input terminal 30. The enabling signal is required to prevent noise in the discriminator output 23 from triggering or "falsing" the system. Since the receiver squelch signal will fall off faster than the outputs of the detector 27, the system would be cut off sooner than it would be without the squelch signal on terminal 30. The squelch signal is, however, delayed slightly in a fast attack, slow decay circuit 31 to prevent a too-fast cut-off during a brief loss of received signal.

The AND gates 28 are coupled to a four-input OR gate 32 which forms a part of a mobile/portable switch circuit 33, thus any channel select signal or signals detected will provide a high output from the OR gate 32. This output is coupled through terminal 34 to the appropriate mobile/repeater circuitry (not shown) for enabling or maintaining the priority unit in the mobile-to-base mode. The output of the OR gate 32 is also coupled through an inverter 35 to a NOR gate 36. A second input to the NOR gate 36 comes from a terminal 37 and is a logic "low" if the portable unit is not inserted and the PTT switch on the mobile unit is not depressed. Thus, it will be seen that the output of the NOR gate 36 in the switch circuit 33 will be low unless a portable unit is requesting the repeater function and, at the same time, the repeater unit is enabled. If the mobile PTT switch is depressed during a portable request, circuitry (not shown) within the repeater 14 in the priority vehicle 11 will prevent the signal at terminal 37 from going high. If the occupant of the vehicle 11 is in communication with the base station (with the PTT switch depressed) when a portable request is received, the high on terminal 37 will produce and maintain a low output from the NOR 36 and the vehicle occupant will retain channel selection control. In other words, any portable transmission in the vicinity has preference over all other demands on the mobile/repeater unit, except use by an occupant of the priority vehicle. The output of the switch circuit 33 is coupled to enable only one of two banks of analog switches 38 and 39 as will be explained hereinafter. The outputs of the four AND gates 28 are also coupled to a priority encoder 40 which, as will be further explained in regard to FIG. 5, allows the signals to be coupled through in accordance with a predetermined priority rating. The received signal having the highest priority will be coupled to an associated switch in the switch bank 38 and if switch bank 38 is enabled by the output of the switch circuit 33, the signal will be coupled to the appropriate one of four channel drivers 41. The channel drivers 41 are in turn coupled to the output circuitry (not shown) of the mobile units for switching on or enabling the circuitry of the selected channel.

As noted hereinabove, the output of the switch circuit 33 is coupled to the switch banks 38 and 39, an inverter 42 being inserted in the lead to switch bank 39 to provide alternate enablement of the switch banks. When NOR gate 36 output is high, switch bank 38 is enabled and one of the channel drivers 41 is activated by the portable. A mobile control head 43, forming a part of each mobile unit 14, allows an occupant of one of the vehicles 11 or 12 to select and use a channel providing no portable unit is requiring service at that time. The mobile control head 43 is coupled to each of the switches in the bank 39, but can provide an output to only one switch at a time. The switch banks 38 and 39 perform essentially AND gating functions, but in the preferred embodiment each bank would include four voltage enabled analog switches such as are found in a Motorola quad analog switch MC14016. The circuit of FIG. 2 is designed particularly for use with a scanner, or a system having all "receive" channels on the same frequency. It can also be used in mobile/repeaters using different channels for transmit and receive, thus, a portable user can select one channel for transmission to the base station 10 and the other channel for direct communication with other mobiles in the area.

FIG. 3 is similar to FIG. 2, but shows an embodiment wherein the portable channel selection is received by the mobile/repeater and the channel selection is latched-in until a different channel is selected. Thus, if the portable 20 has selected channel two (as shown in FIG. 1B) the mobile will transmit and receive on channel two until the portable selects a different channel, or until an occupant of the vehicle selects a different channel via the mobile control head 43 while the portable 20 is not activated. To accomplish this, a quad latch 44 such as the Motorola MC14042 is inserted between the priority encoder 40 and the switch bank 38. When the polarity terminal of the latch 44 is high, the quad latch 44 will pass data through while the clock input is high, then latch on that channel when the clock input goes low. The output of the OR gate 32 is connected to the clock input (CL) and a voltage source (not shown) is connected to provide a permanent high on the polarity terminal. Therefore, the quad latch 44 will stay latched indefinitely on the last channel chosen, that is, all outputs will remain high (or low) until a new clock pulse arrives from OR gate 32 but can be changed at the beginning of each new PL detection. A capacitor 45 may be desirable on each input A-D of latch 44 to maintain the data until the latch latches. In the mobile/portable switch section 33' of FIG. 3, the OR gate 32 outputs a high at any PL detect, as in FIG. 2. This high is the enabling signal coupled to the repeater via terminal 34 and it is also coupled to one input of a NOR gate 46. The output of the NOR gate 46 is coupled to one input of the NOR gate 36, the output of which enables one of the analog switch banks 38 or 39. The output of the NOR gate 36 is also coupled back to the second input of the NOR gate 46, thus, when OR gate 32 goes high NOR gate 46 outputs a low and the switch bank 38 is enabled via NOR gate 36 unless the PTT or repeater disable circuit has put a high on terminal 37. The high output of NOR gate 36 is now present on the second input of NOR gate 46, keeping the NOR gate output 46 low and maintaining the high output from NOR gate 36.

The delay line 31 is particularly desirable in the embodiment of FIG. 3 since a noise "pop" from the detectors 27 could otherwise cause the quad latch 44 to be latched. This embodiment would be particularly advantageous when only one portable is present at a location.

The embodiment of FIG. 4 is similar to those of FIGS. 2 and 3, but provides receiver "steering" as well as transmitter steering rather than latching. This embodiment is intended for use when several portables are likely to be present at one location, or where automatic return to a "home" frequency is desired. As shown in FIG. 4, the portable unit 20 can choose a channel in the mobile/repeater 14 for transmission to the base station 10 and the mobile/repeater 14 will stay on that channel for a set delay period after that transmission. If a signal is received from the base station 10 on that channel during that delay period, the mobile/repeater 14 will remain on the channel through that return transmission and through the same delay period to allow the base station to transmit again. After a delay period during which no transmission is initiated or received, the mobile/repeater will switch back to the channel chosen by the mobile control head or "home" channel. Since experience has shown that most responses begin less than seven seconds after the previous transmission, the preferred delay period is 7-10 seconds.

To provide receiver steering, the switch circuit 33 of FIG. 2 is replaced by a switch circuit 33" which provides the set delay period after each transmission on the chosen channel. Before any portable signal has been detected, and assuming that neither the PTT nor repeater disable switch is activated, the output of the OR gate 32 will be low, the output of NOR gate 35 will be high and the output of NOR gate 36 will be low, indicating mobile channel control. The low from OR gate 32 through a resistor 47 and a diode 48 also puts a low on one input of a NOR gate 50 and a large capacitor 51 remains uncharged. The signal at a terminal 52, indicating no mobile carrier being received, is coupled to one input of a NOR gate 53 as is a B+ supply, and the output of the NOR gate 35 to the other input. Therefore, the output of the NOR gate 53 is low, the output of NOR gate 50 is high, the output of an inverter 55, coupled to another input of NOR gate 35, is low. When a PL detect signal appears at the output of the OR gate 32, the large capacitor 51 begins charging through resistor 47 and diode 48. The output of the NOR gate 50 goes low, the output of the inverter 55 goes high, the output of the NOR gate 35 goes to zero and the output of NOR gate 36 goes to one, allowing the portable to select the channel desired. At the end of the portable transmission, the output of the OR gate 34 returns to zero, and the capacitor 51 starts to discharge through a relatively large resistor 56. The input of the NOR gate 50 which is coupled to the capacitor 51 starts toward a low with the time constant of preferably seven to ten seconds. If no signal is received on the mobile channel during that period, the signal on terminal 52 will remain high, the output of the NOR gate 53 will remain low and when the voltage on the capacitor 51 is sufficiently low, the NOR gate 50 will have two low inputs, thus a high output. The output of the inverter 55 will be low and, with two lows on its inputs, NOR gate 35 will be high. Assuming that the PTT switch has not already been depressed, the output of the NOR gate 36 will now return to zero allowing mobile frequency control. At any time the PTT switch is depressed or the portable reinserted in the repeater, the output of the NOR 36 will go to zero allowing mobile control.

If, during the discharge time of the capacitor 51, the input on terminal 52 goes low, indicating that a response has been received on the mobile channel, the output of the NOR 53 will go high, the output of the NOR 50 will go low, the inverter 55 output will go high, the output of the NOR 35 will go low and the output of the NOR 36 will go high, retaining the portable channel selection. When the output of the NOR 53 went high, the large capacitor 51 was again charged, this time through a diode 57 and a resistor 58. At the end of the mobile transmission the signal on terminal 52 will go high, the output of NOR gate 53 will go low and the large capacitor 51 will again begin to discharge through the large resistor 59. This second delay period allows the user of the portable 20 to continue the conversation if desired, if not, the output of the NOR gate 36 will go low returning channel control to the mobile unit. It is to be noted that switch circuit 33" could be constructed with appropriate jumpers to allow easy conversion to the functions of switch circuits 33 or 33'.

In FIG. 5 is shown the logic diagram for the priority encoder 40 of FIGS. 2-4. The logic elements of the priority encoder 40 are standard OR, NOR and NAND gates and their internal operation need not be explained herein. It will, of course, be apparent to one skilled in the art that equivalent functions may be obtained using other combinations of logic elements. A signal indicating a request for the channel having the highest priority is coupled through input A of the priority encoder 40 to both inputs of a NAND 59 which inverts the signal and couples it to the output A' regardless of any signals on inputs B, C or D. In this embodiment, an input high will indicate a request for the corresponding channel, and an output low will enable that channel. Thus, a high on input A will, in all cases, provide an output low on output A'. A request for the channel having the second highest priority will put a high on input B, coupled to one input of a NAND gate 60. The NAND gate 60, having a second input coupled to output A', will provide an output low on the output B' unless there is also a high on input A. The input A is also coupled to one input of a NOR gate 61, which has a second input from input B. Thus, if inputs A and/or B are high, NOR gate 61 will output a low to one input of a NAND 62. The input C is coupled to a second input of the NAND 62; therefore, unless inputs A or B are high, meaning that at least one of the two higher priority channels has been requested, a request for the third highest priority channel will provide an enabling low on output C'. The output of the NOR 61 is also coupled to one input of a NAND gate 63 and the input D is coupled to a second input. Thus, a request for the fourth channel will provide an output low from NAND gate 63 unless the first or second channel has been requested. The output of the NAND gate 63 is coupled to one input of an OR gate 64 and the input C is coupled to the other input. An output low from the NAND gate 63 will cause an output low from the OR gate 64 unless the third highest priority channel has been requested. To summarize the operation of the priority encoder 40, a request for the channel which has been assigned the highest priority will be acted upon regardless of any other channel request. The channel having the next highest priority can be enabled unless the higher priority channel has been requested. Likewise, the third and fourth channels can be enabled only when no channel having higher priority has been requested.

Thus, there has been provided in accordance with the invention, a system in which channel selection for a mobile transceiver can be achieved from a detached portable unit and two requests from different channels will not cause interference.

What is claimed is:

1. A channel selection circuit for remote selection of ones of a plurality of prioritized channels of a multichannel communications system including in combination:
   means for receiving a plurality of transmitted channel selection signals each of said signals corresponding to a predetermined priority of one channel of the system;
   a plurality of first detector means coupled to the receiving means and each separately providing an output signal only in response to a different channel selection signal within the received signals;
   channel prioritizing means coupled to the detector means for providing an output signal in response to the one received predetermined signal having the highest channel priority and including frist input means for receiving a first predetermined signal from said first detector means, first logic means coupled to the first input means for providing an output signal in response to the reception of the first predetermined signal, said first logic means output signal being the signal for the highest priority channel, second input means for receiving a second predetermined signal from said first detector means, second logic means coupled to provide an output signal in response to the reception of the second predetemined signal in the absence of the first predetermined signal, said second logic means output signal being the signal for the second highest priority channel; and
   a plurality of channel driver means coupled to receive the output signal of the channel prioritizing means for enabling the circuitry of the appropriate channel.

2. The channel selection circuit according to claim 1 wherein the channel prioritizing means includes additional input means for receiving additional predetermined signals from said first detector means, and additional logic means coupled to provide outputs in response to the reception of the additional predetermined signals in the absence of signals having higher priority.

3. The channel selection circuit according to claim 1 and further including second detector means coupled to the first detector means for providing a first output signal in response to any of the output signal from the first detector means and a different output signal in the absence of all of the output signals from the first dectector means;
   a first plurality of switching means coupled between the prioritizing means and the channel driver means and enabled by the first output signal of the second detector means;
   manual channel select means for providing local channel selection;
   a second plurality of switching means coupled between the manual channel select means and the channel driver means and enabled by the second output signal of the second detector means.

4. The channel selection circuit according to claim 1 and further including input means for receiving a predetermined signal from other portions of the communications system, for decoupling the channel driver means from control by the channel prioritizing means in the presence of said predetermined signal from said other system portions or in the absence of the reception of any of the plurality of channel selection signals and for coupling the channel driver means to be controlled by said other portions of the communications system.

5. The channel selection circuit according to claim 1 and further including second detector means coupled to the first dector means for providing a first output signal in response to the detection of any of the output signals from the first detector means;
   a plurality of latching means coupled to the output of the prioritizing means and to the output of the second detector means for enabling a selected one of the channel driver means until a different one of the predetermined signals is detected.

* * * * *